US012417399B2

(12) United States Patent
Brown et al.

(10) Patent No.: US 12,417,399 B2
(45) Date of Patent: Sep. 16, 2025

(54) HYBRID QUANTUM-CLASSICAL COMPUTING ENVIRONMENTS

(71) Applicant: Quantinuum LLC, Broomfield, CO (US)

(72) Inventors: Natalie Christine Brown, Broomfield, CO (US); Matthew DeCross, Broomfield, CO (US); Ciaran Ryan-Anderson, Broomfield, CO (US); John Peter Campora, Broomfield, CO (US); Eli Chertkov, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 155 days.

(21) Appl. No.: 18/446,825

(22) Filed: Aug. 9, 2023

(65) Prior Publication Data

US 2024/0062091 A1 Feb. 22, 2024

Related U.S. Application Data

(60) Provisional application No. 63/371,579, filed on Aug. 16, 2022.

(51) Int. Cl.
*G06N 10/40* (2022.01)
*G06F 15/78* (2006.01)
*G06N 10/60* (2022.01)

(52) U.S. Cl.
CPC ............. *G06N 10/40* (2022.01); *G06F 15/78* (2013.01); *G06N 10/60* (2022.01)

(58) Field of Classification Search
CPC ......... G06F 15/78; G06N 10/40; G06N 10/60
See application file for complete search history.

(56) References Cited

U.S. PATENT DOCUMENTS

| | | | |
|---|---|---|---|
| 11,037,776 B1 | 6/2021 | Makotyn et al. | |
| 2008/0313430 A1* | 12/2008 | Bunyk | G06N 10/40 712/E9.082 |
| 2021/0019132 A1* | 1/2021 | Gambetta | G06N 10/80 |

(Continued)

OTHER PUBLICATIONS

Lubinski, Thomas, et al., "Advancing Hybrid Quantum-Classical Computation with Real-Time Execution", dated Jun. 28, 2022, submitted to Cornell University Online Archive on Jun. 26, 2022, available on the Internet at arXiv:2206.12950v1, 19 pages.

(Continued)

*Primary Examiner* — Zachary K Huson
(74) *Attorney, Agent, or Firm* — Alston & Bird LLP

(57) ABSTRACT

One or more real time engines of a quantum computer provide quantum measurement information to a classical computing engine via a classical function call. The quantum computer includes a controller comprising the one or more real time engines in communication with the classical computing engine, and a quantum processor. The controller is configured to control operation of one or more components of the quantum processor. The real time engines receive a classical call response comprising an indication of a result determined via execution of a classical function by the classical computing engine based at least in part on the classical function call; and control operation of the one or more components of the quantum processor based at least in part on the result.

20 Claims, 8 Drawing Sheets

(56) References Cited

U.S. PATENT DOCUMENTS

Figure 1:
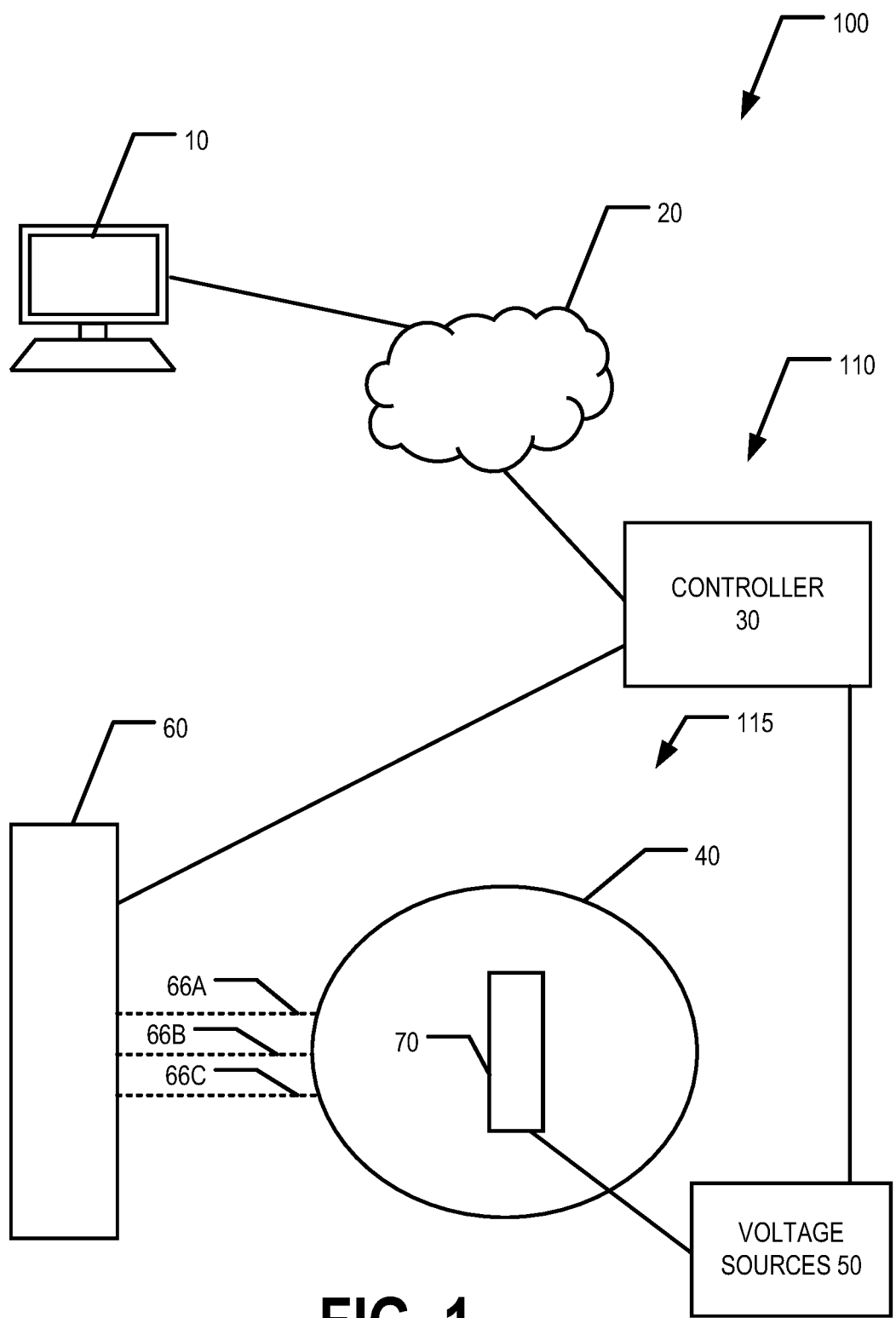

| | | |
|---|---|---|
| 2021/0233617 A1* | 7/2021 | Niroula ............... G06F 30/20 |
| 2021/0334128 A1 | 10/2021 | Zeng |
| 2022/0199391 A1 | 6/2022 | Hayes et al. |
| 2022/0383177 A1* | 12/2022 | Alcazar ............... G06N 10/40 |
| 2023/0057368 A1 | 2/2023 | Langer et al. |
| 2023/0125251 A1 | 4/2023 | Baldwin et al. |

OTHER PUBLICATIONS

Outgoing—ISA/210—International Search Report Mailed on Jul. 5, 2024 for WO Application No. PCT/US23/030051, 3 page(s).
Outgoing Written Opinion of the ISA Mailed on Jul. 5, 2024 for WO Application No. PCT/US23/030051, 19 page(s).
U.S. Provisional Application for "Fault Tolerant Quantum Error Correction Using Physical Transport of Qubits", unpublished (filed Jul. 14, 2022), Patricia Lee (Inventor), Quantinuum LLC (Assignee), U.S. Appl. No. 63/368,421.

* cited by examiner

HYBRID QUANTUM-CLASSICAL COMPUTING ENVIRONMENTS

CROSS-REFERENCE TO RELATED APPLICATIONS

This application claims priority to U.S. Application No. 63/371,579, filed Aug. 16, 2022, the content of which is incorporated herein by reference in its entirety.

TECHNICAL FIELD

Various embodiments relate to hybrid quantum-classical computing environments and methods for use thereof. For example, various embodiments relate to the use of classical function results in controlling the performance of a quantum computer. For example, various embodiments relate to using quantum computing results in performing classical algorithms.

BACKGROUND

Quantum programs can be generated and performed on a quantum processor. Various errors may occur while performing the quantum program. However, it may be difficult to make adjustments to the quantum program that is being performed so as to correct various errors before the errors become unresolvable. This can result in an instance of performing the quantum program being a waste of resources. Through applied effort, ingenuity, and innovation many deficiencies of such prior computing systems have been solved by developing solutions that are structured in accordance with the embodiments of the present invention, many examples of which are described in detail herein.

BRIEF SUMMARY OF EXAMPLE EMBODIMENTS

Example embodiments provide hybrid quantum-classical computing environments. In various embodiments, a hybrid quantum-classical computing environment includes one or more real time engines configured to execute real time executable instructions to control one or more components of a quantum processor to cause the quantum processor to perform a quantum circuit. Various embodiments provide hybrid quantum-classical computing systems, quantum computer processors, methods for using a hybrid quantum-classical computing system, and/or the like. In various embodiments, the hybrid quantum-classical computing environment further includes at least one classical computing engine configured to execute one or more classical functions, algorithms, and/or computations.

In various embodiments, the one or more real time engines are configured to generate and provide classical function calls, receive classical call responses, and to control one or more components of the quantum processor based on the classical call responses. In various embodiments, the classical computing engine is configured to receive a classical function call comprising quantum measurement information, execute a respective classical function based at least in part on the quantum measurement information, and provide a classical call response including a result of the execution of the classical function based at least in part on the quantum measurement information.

In various embodiments, the at least one classical computing engine is configured to execute quantum-assisted classical algorithms, generate and provide quantum function calls, receive quantum call responses, and to use the quantum call responses in the execution of the quantum-assisted classical algorithm. In various embodiments, the one or more real time engines are configured to receive a quantum function call, cause the quantum processor to execute a quantum circuit based at least in part on the quantum function call, determine a result of the quantum circuit, and generate and provide a quantum call response based on the result of the quantum circuit.

According to a first aspect, a method for operating a quantum computer is provided. In an example embodiment, the method is performed by one or more real time engines of the quantum computer. The quantum computer comprises a controller comprising the one or more real time engines, which are in communication with at least one classical computing engine. The quantum computer further includes a quantum processor. The controller is configured to control operation of one or more components of the quantum processor. In an example embodiment, the method comprises providing quantum measurement information to the at least one classical computing engine via a classical function call; receiving a classical call response comprising an indication of a result determined via execution of a classical function by the classical computing engine based at least in part on the classical function call; and controlling operation of the one or more components of the quantum processor based at least in part on the result.

In an example embodiment, the method further comprises controlling operation of the one or more components of the quantum processor to cause the capturing of the one or more quantum measurements, wherein the quantum measurement information is determined based on the one or more quantum measurements.

In an example embodiment, the controller further comprises or is in communication with one or more voltage source drivers and one or more laser drivers and controlling operation of the one or more components of the quantum processor comprises controlling operation of the one or more voltage source drivers and controlling operation of the one or more laser drivers.

In an example embodiment, communication between the one or more real time engines and the at least one classical computing engine is asynchronous.

In an example embodiment, the one or more real time engines comprise two or more real time engines and the communication between the two or more real time engines is synchronous.

In an example embodiment, one or more real time engines are configured to execute executable instructions compiled from Quantum Assembly (QASM) or a Quantum Intermediate Representation (QIR) code.

In an example embodiment, the classical computing engine is part of the controller.

In an example embodiment, the classical function call and the classical call response are both in accordance with inter-component communication (ICC) standards.

In an example embodiment, the one or more quantum measurements are syndrome measurements and the classical function is a quantum error correction (QEC) decoder.

In an example embodiment, wherein the quantum measurement information provides an indication of respective results of one or more quantum measurements captured during performance of a quantum circuit by the quantum processor.

In an example embodiment, controlling operation of the one or more components of the quantum processor based at least in part on the classical call response comprises at least one of (a) selecting a quantum circuit portion to be performed, (b) conditioning one or more quantum gates, (c) determining a number of times a quantum circuit portion is performed based on the classical call response.

In an example embodiment, a time between the providing of the classical function call and receipt of the classical call response is less than a coherence time of a qubit of the quantum processor.

According to another aspect, a controller of a quantum computing system is provided. The controller (a) is configured to control operation of one or more components of a quantum processor, (b) comprises one or more real time engines that are in communication with at least one classical computing engine, and (c) comprises a classical memory storing executable instructions. The executable instructions are configured to, when executed by the one or more real time engines, cause the controller to at least provide quantum measurement information to the at least one classical computing engine via a classical function call; receive a classical call response comprising an indication of a result determined via execution of a classical function by the classical computing engine based at least in part on the classical function call; and control operation of the one or more components of the quantum processor based at least in part on the result.

In an example embodiment, the executable instructions are further configured to, when executed by the one or more real time engines, cause the controller to at least control operation of the one or more components of the quantum processor to cause the capturing of the one or more quantum measurements, wherein the quantum measurement information is determined based on the one or more quantum measurements.

In an example embodiment, the controller further comprises or is in communication with one or more voltage source drivers and one or more laser drivers and controlling operation of the one or more components of the quantum processor comprises controlling operation of the one or more voltage source drivers and controlling operation of the one or more laser drivers.

In an example embodiment, communication between the one or more real time engines and the at least one classical computing engine is asynchronous.

In an example embodiment, the one or more real time engines comprise two or more real time engines and the communication between the two or more real time engines is synchronous.

In an example embodiment, one or more real time engines are configured to execute executable instructions compiled from Quantum Assembly (QASM) or a Quantum Intermediate Representation (QIR) code.

In an example embodiment, the classical computing engine is part of the controller.

In an example embodiment, the classical function call and the classical call response are both in accordance with inter-component communication (ICC) standards.

In an example embodiment, the one or more quantum measurements are syndrome measurements and the classical function is a quantum error correction (QEC) decoder.

In an example embodiment, wherein the quantum measurement information provides an indication of respective results of one or more quantum measurements captured during performance of a quantum circuit by the quantum processor.

In an example embodiment, controlling operation of the one or more components of the quantum processor based at least in part on the classical call response comprises at least one of (a) selecting a quantum circuit portion to be performed, (b) conditioning one or more quantum gates, (c) determining a number of times a quantum circuit portion is performed based on the classical call response.

In an example embodiment, a time between the providing of the classical function call and receipt of the classical call response is less than a coherence time of a qubit of the quantum processor.

According to still another aspect, a hybrid quantum-classical computing system is provided. In an example embodiment, the hybrid quantum-classical computing system comprises at least one classical computing engine, one or more real time engines, and a quantum processor. The one or more real time engines are configured to control operation of one or more components of the quantum processor. The one or more real time engines are configured to execute executable instructions to cause performance of providing quantum measurement information to the at least one classical computing engine via a classical function call; receiving a classical call response comprising an indication of a result determined via execution of a classical function by the classical computing engine based at least in part on the classical function call; and controlling operation of the one or more components of the quantum processor based at least in part on the result. The at least one classical computing engine is configured to execute program code to cause performance of executing a classical algorithm based on the classical function call and providing the classical call response.

In an example embodiment, the executable instructions are further configured to cause the one or more real time engines to perform controlling operation of the one or more components of the quantum processor to cause the capturing of the one or more quantum measurements, wherein the quantum measurement information is determined based on the one or more quantum measurements.

In an example embodiment, the controller further comprises or is in communication with one or more voltage source drivers and one or more laser drivers and controlling operation of the one or more components of the quantum processor comprises controlling operation of the one or more voltage source drivers and controlling operation of the one or more laser drivers.

In an example embodiment, communication between the one or more real time engines and the at least one classical computing engine is asynchronous.

In an example embodiment, the one or more real time engines comprise two or more real time engines and the communication between the two or more real time engines is synchronous.

In an example embodiment, one or more real time engines are configured to execute executable instructions compiled from Quantum Assembly (QASM) or a Quantum Intermediate Representation (QIR) code.

In an example embodiment, the classical computing engine is part of the controller.

In an example embodiment, the classical function call and the classical call response are both in accordance with inter-component communication (ICC) standards.

In an example embodiment, the one or more quantum measurements are syndrome measurements and the classical function is a quantum error correction (QEC) decoder.

In an example embodiment, wherein the quantum measurement information provides an indication of respective results of one or more quantum measurements captured during performance of a quantum circuit by the quantum processor.

In an example embodiment, controlling operation of the one or more components of the quantum processor based at least in part on the classical call response comprises at least one of (a) selecting a quantum circuit portion to be performed, (b) conditioning one or more quantum gates, (c) determining a number of times a quantum circuit portion is performed based on the classical call response.

In an example embodiment, a time between the providing of the classical function call and receipt of the classical call response is less than a coherence time of a qubit of the quantum processor.

According to yet another aspect, a method for performing a quantum-assisted classical algorithm is provided. For example, in an example embodiment, the quantum-assisted classical algorithm comprises one or more quantum function calls that are used to improve the performance of the classical computing engine executing the quantum-assisted classical algorithm. In an example embodiment, the method comprises beginning to execute the quantum-assisted classical algorithm; generating and providing a quantum function call such that the one or more real time engines cause a controller of a quantum computer to control operation of one or more components of a quantum processor to perform a quantum function and generate a quantum call response based on a result of performing the quantum function; receiving the quantum call response; and continuing to execute the quantum-assisted classical algorithm based at least in part on the quantum call response.

In an example embodiment, the controller further comprises or is in communication with one or more voltage source drivers and one or more laser drivers and controlling operation of the one or more components of the quantum processor comprises controlling operation of the one or more voltage source drivers and controlling operation of the one or more laser drivers.

In an example embodiment, communication between the one or more real time engines and the classical computing engine is asynchronous.

According to still another aspect, a classical computing entity is provided. In an example embodiment, the classical computing entity comprises at least one processor and a non-transitory memory storing program code. The program code is configured to, when executed by the at least one processor, to cause the classical computing entity to begin executing a quantum-assisted classical algorithm; generate and provide a quantum function call such that one or more real time engines cause a controller of a quantum computer to control operation of one or more components of a quantum processor to perform a quantum function and generate a quantum call response based on a result of performing the quantum function; receive the quantum call response; and continue to execute the quantum-assisted classical algorithm based at least in part on the quantum call response.

In an example embodiment, the controller further comprises or is in communication with one or more voltage source drivers and one or more laser drivers and controlling operation of the one or more components of the quantum processor comprises controlling operation of the one or more voltage source drivers and controlling operation of the one or more laser drivers.

In an example embodiment, communication between the one or more real time engines and the classical computing engine is asynchronous.

According to another aspect, hybrid quantum-classical computing system is provided. In an example embodiment, the system comprises a quantum computer comprising a controller and a quantum processor. The controller (a) is configured to control operation of one or more components of the quantum processor and (b) comprises one or more real time engines and a first classical memory storing executable instructions. The system further includes a classical computing engine and a second classical memory storing program code. The program code is configured to, when executed by the classical computing engine, cause the classical computing engine to at least perform beginning to perform a quantum-assisted classical algorithm; generating and providing a quantum function call such that the one or more real time engines cause the controller to control operation of the one or more components of the quantum processor to perform a quantum function and generate a quantum call response based on a result of performing the quantum function; receiving the quantum call response; and continuing to perform the quantum-assisted classical algorithm based at least in part on the quantum call response. The first executable instructions are configured to, when executed by the one or more real time engines, cause the quantum processor at least perform executing the quantum function in response to the quantum function call; determining a quantum call response based on a result of executing the quantum function; and providing the quantum call response such that the classical computing engine receives the quantum call response.

In an example embodiment, the controller further comprises or is in communication with one or more voltage source drivers and one or more laser drivers and controlling operation of the one or more components of the quantum processor comprises controlling operation of the one or more voltage source drivers and controlling operation of the one or more laser drivers.

In an example embodiment, communication between the one or more real time engines and the classical computing engine is asynchronous.

In an example embodiment, the classical computing engine is part of the controller.

In an example embodiment, the classical computing engine is part of a classical computing entity in communication with the controller.

BRIEF DESCRIPTION OF THE SEVERAL VIEWS OF THE DRAWING(S)

Figure 2:
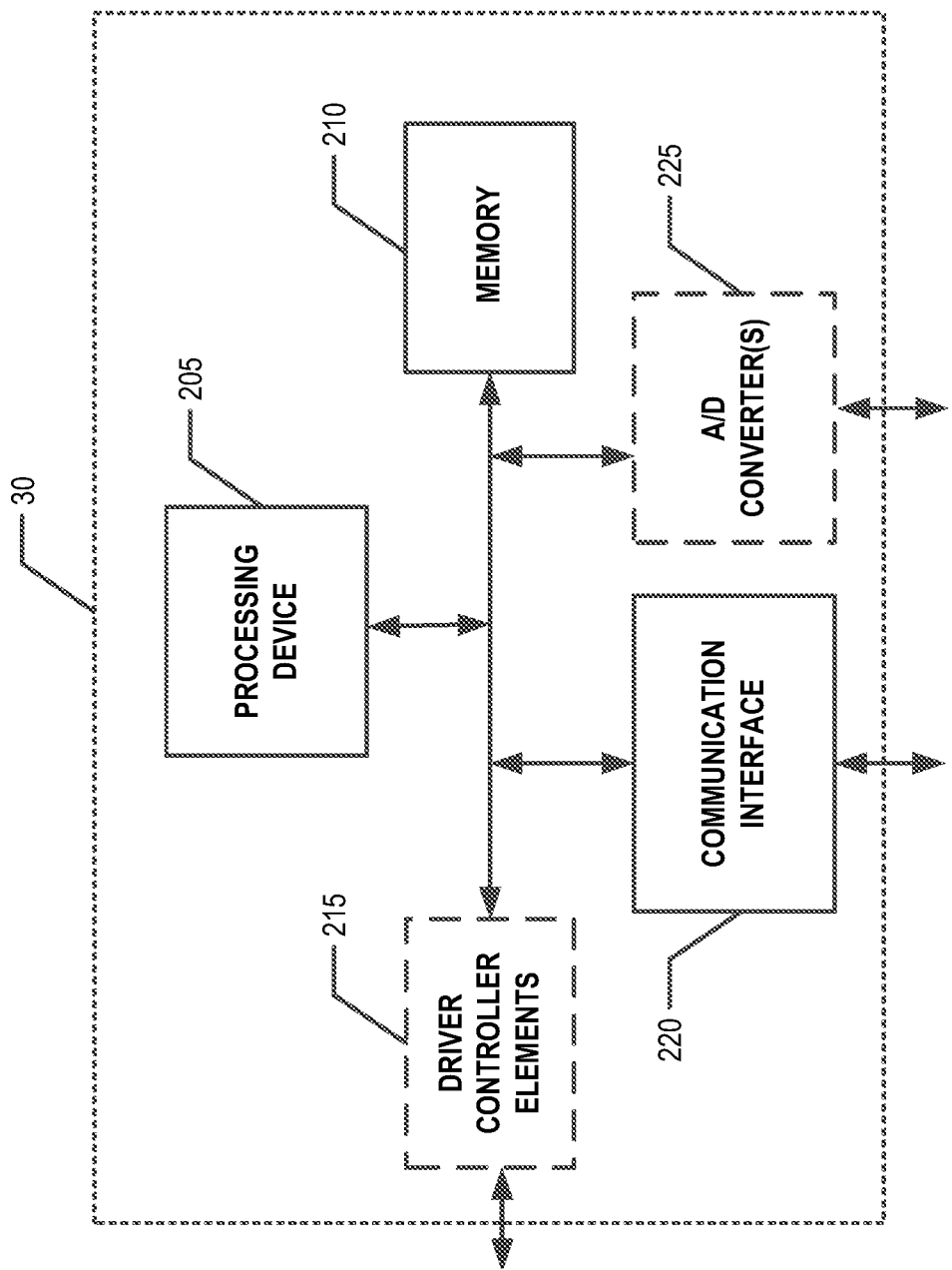
Figure 3:
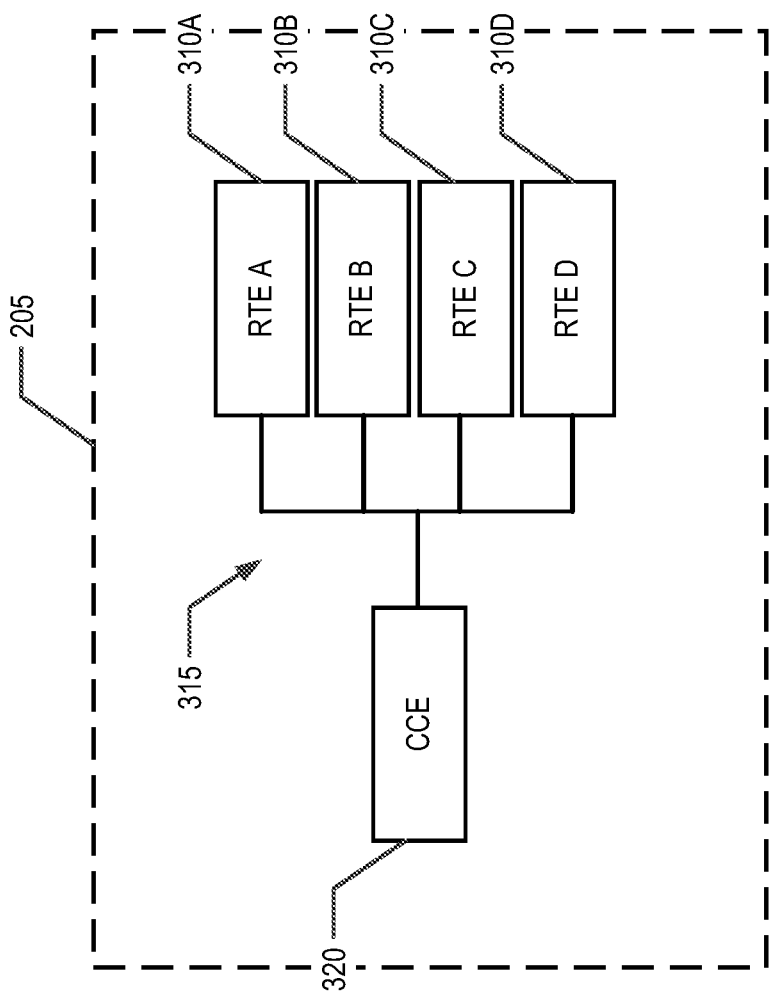
Figure 4:
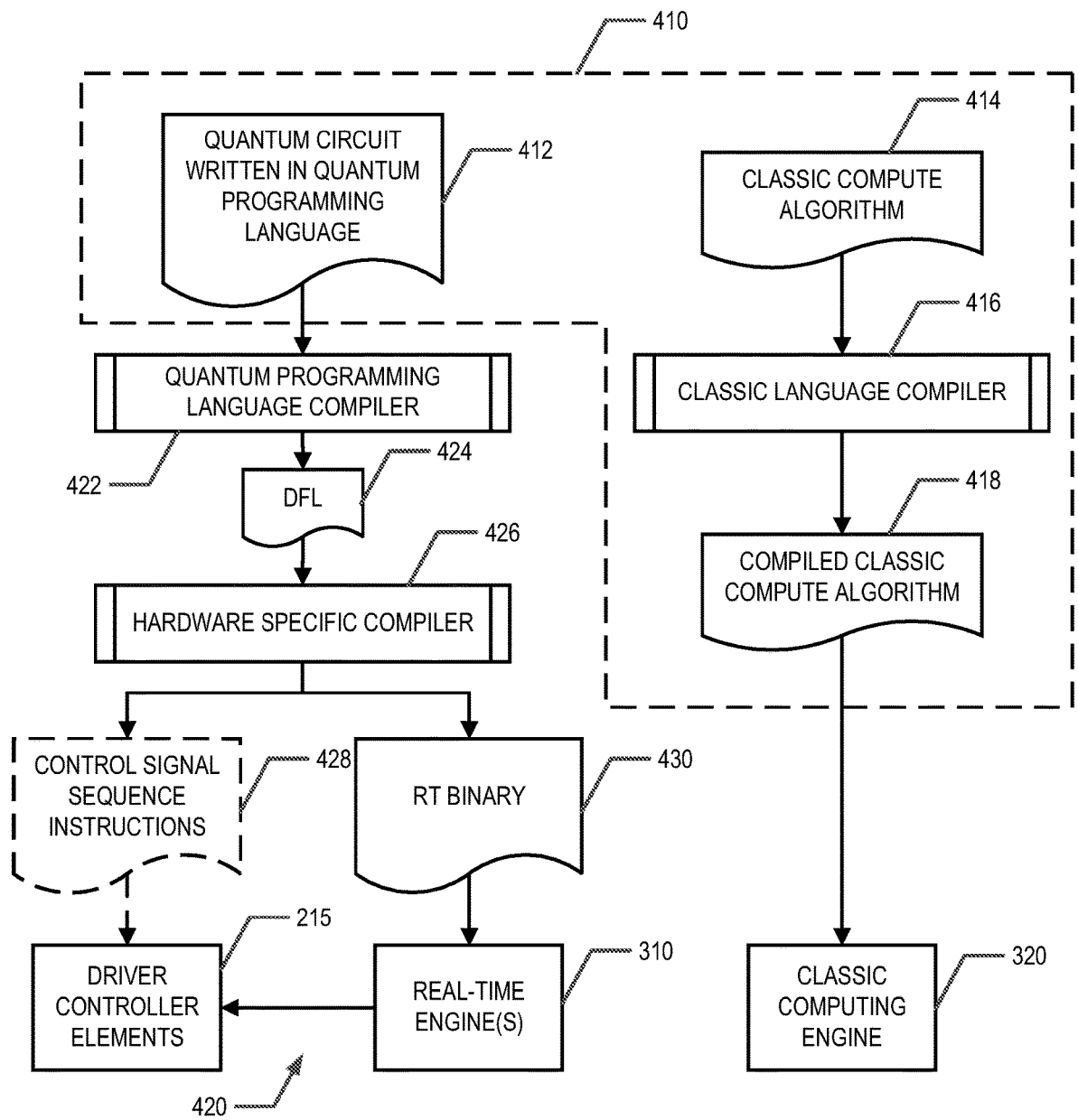
Figure 5:
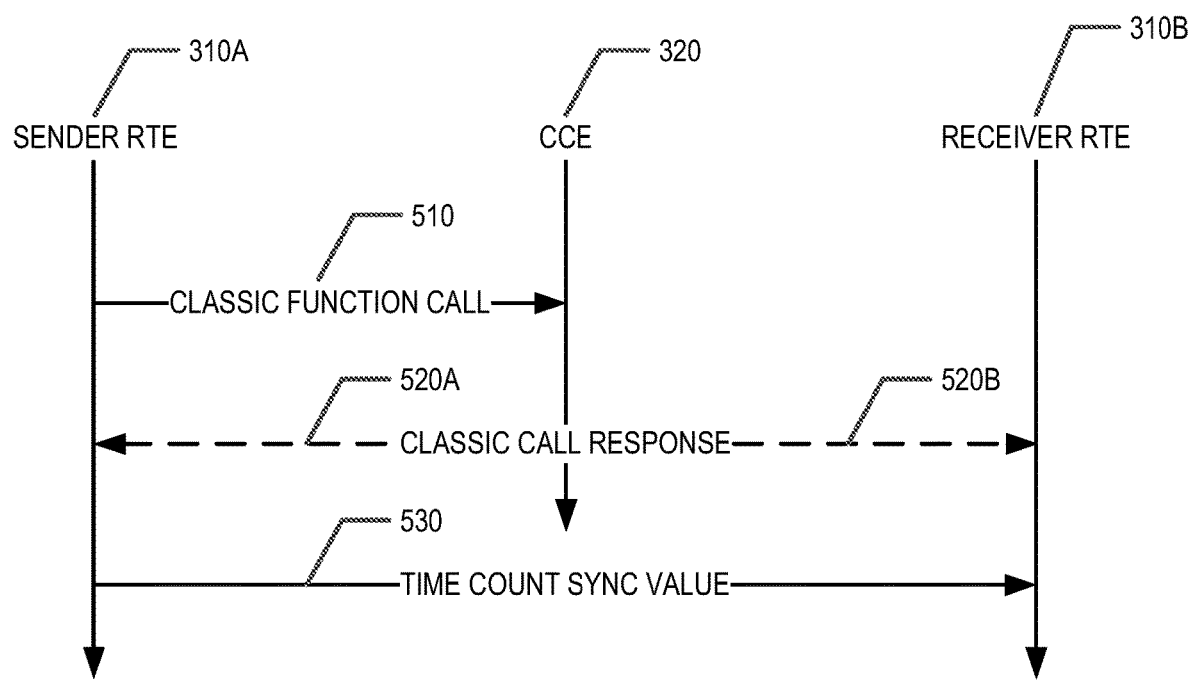
Figure 6A:
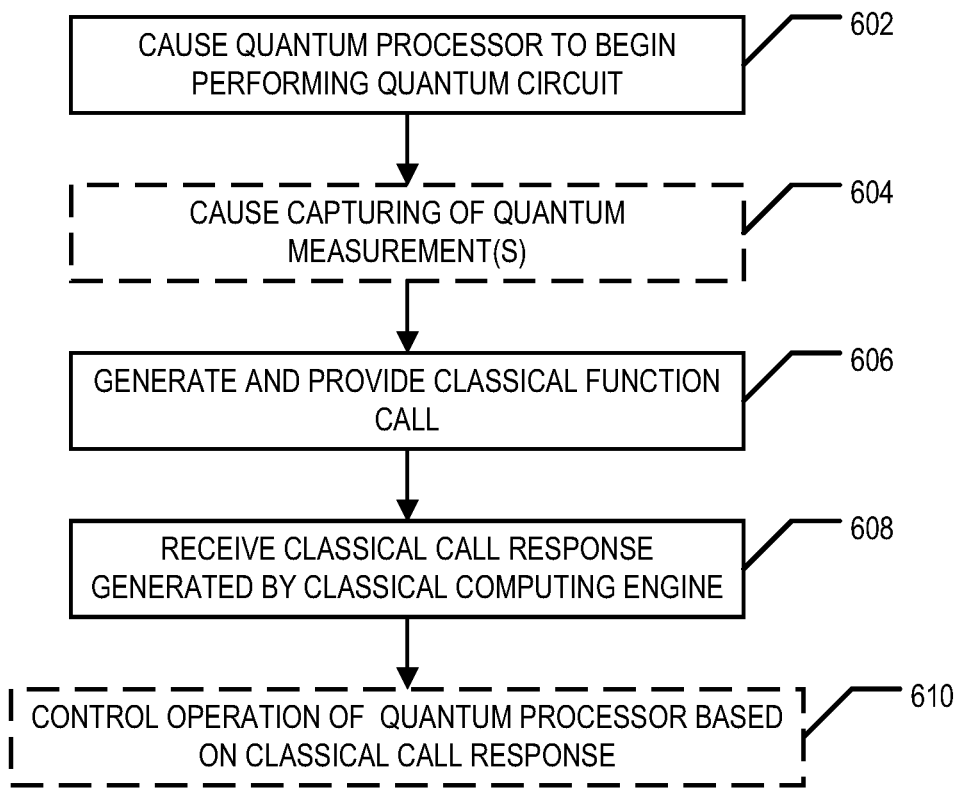
Figure 6B:
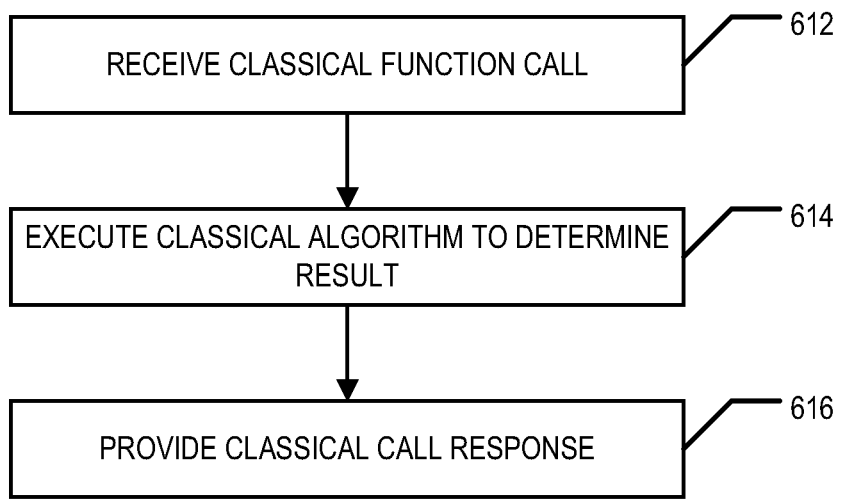
Figure 7A:
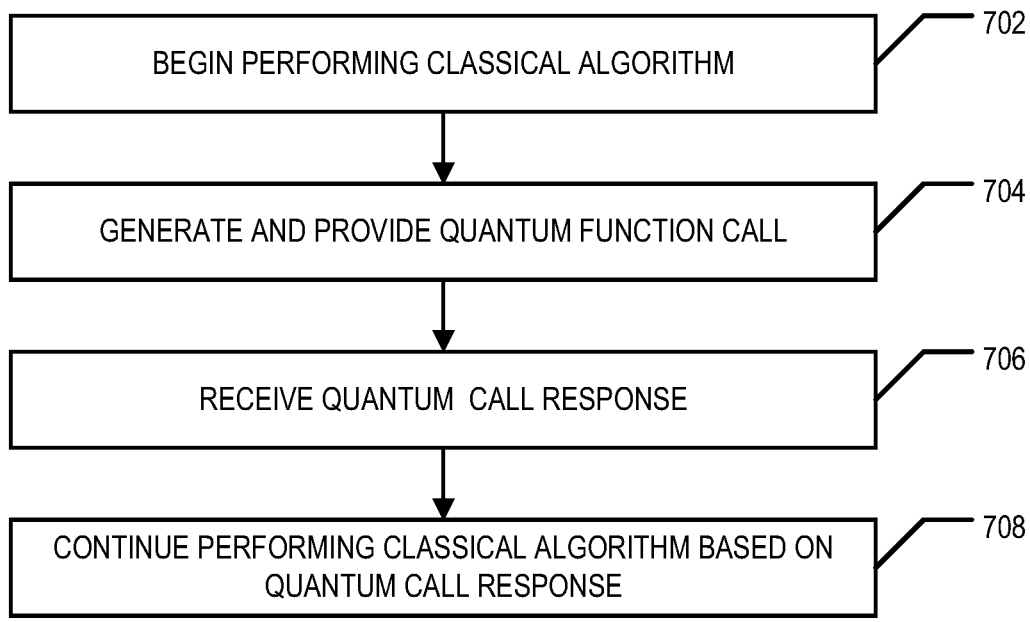
Figure 7B:
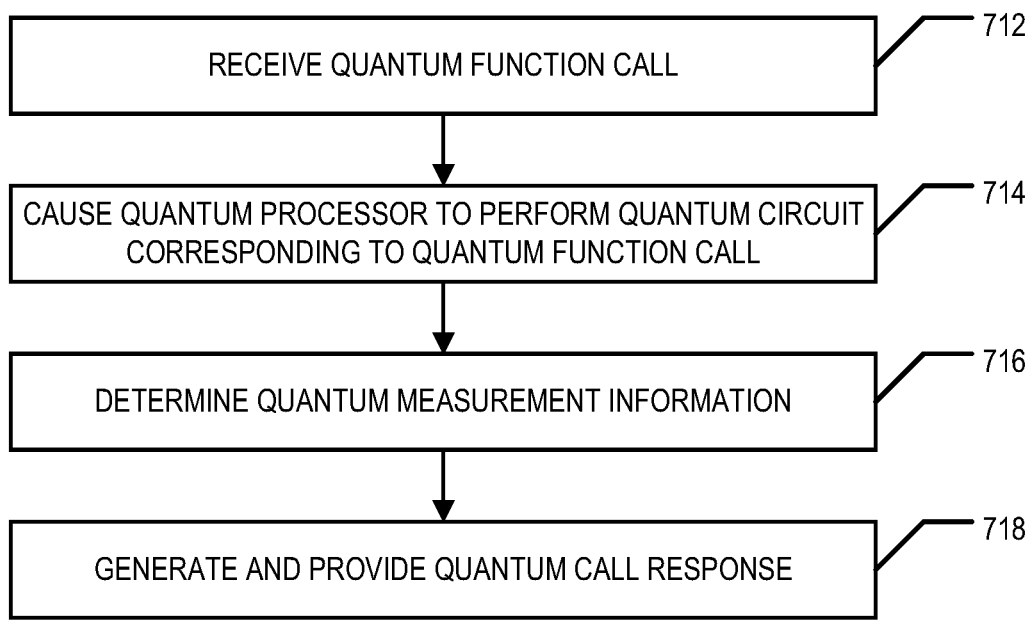
Figure 8:
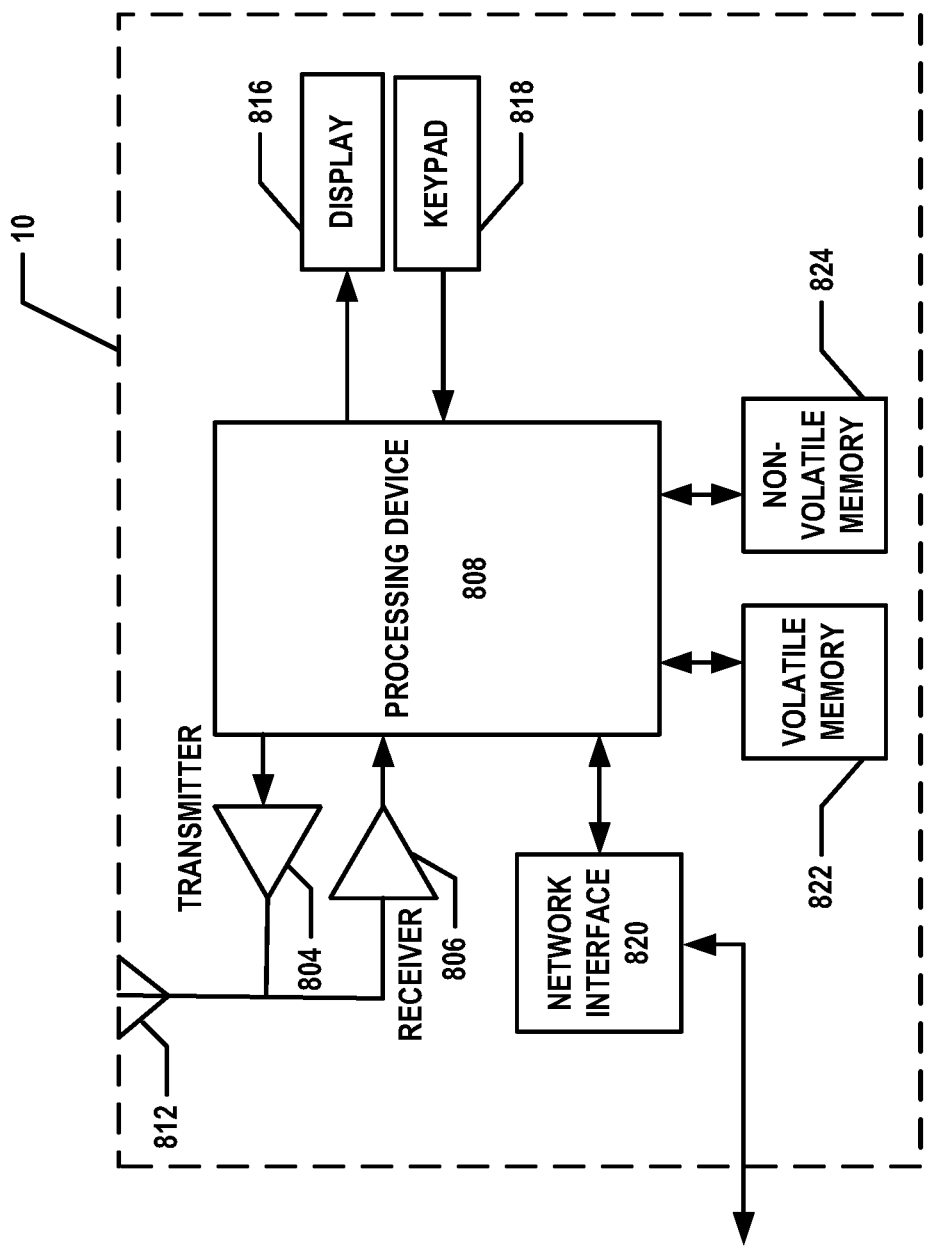

Having thus described the invention in general terms, reference will now be made to the accompanying drawings, which are not necessarily drawn to scale, and wherein:

FIG. 1 is a schematic diagram illustrating an example hybrid quantum-classical computing system, according to various embodiments;

FIG. 2 provides a schematic diagram of an example controller of a quantum computer, according to various embodiments;

FIG. 3 provides a schematic diagram of an example processing device of a controller of a quantum computer, according to various embodiments;

FIG. 4 provides a data flow diagram of providing respective executable instructions to various computing engines of a hybrid quantum-classical computing system, according to various embodiments;

FIG. 5 provides a data flow diagram for a classical function call and a classical call response, according to various embodiments;

FIG. 6A provides a flowchart illustrating process, procedures, and/or operations performed by one or more real time engines for executing a quantum circuit, according to various embodiments;

FIG. 6B provides a flowchart illustrating processes, procedures, and/or operations performed by at least one classical computing engine for responding to a classical function call, according to various embodiments;

FIG. 7A provides a flowchart illustrating processes, procedures, and/or operations performed by at least one classical computing engine for performing and/or executing a quantum-assisted classical algorithm, according to various embodiments;

FIG. 7B provides a flowchart illustrating processes, procedures, and/or operations performed by one or more real time engines for responding to a quantum function call, according to various embodiments; and FIG. 8 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits/tolerances and/or within user measurement capabilities, unless otherwise indicated Like numbers refer to like elements throughout.

I. General Overview

Example embodiments provide hybrid quantum-classical computing environments. In various embodiments, a hybrid quantum-classical computing environment includes one or more real time engines configured to execute real time executable instructions to control one or more components of a quantum processor to cause the quantum processor to perform a quantum circuit. Various embodiments provide hybrid quantum-classical computing systems, quantum computer processors, methods for using a hybrid quantum-classical computing system, and/or the like. In various embodiments, the hybrid quantum-classical computing environment further includes at least one classical computing engine configured to execute one or more classical functions, algorithms, and/or computations.

In various embodiments, the one or more real time engines are configured to generate and provide classical function calls, receive classical call responses, and to control one or more components of the quantum processor based on the classical call responses. In various embodiments, the classical computing engine is configured to receive a classical function call comprising quantum measurement information, execute a respective classical function based at least in part on the quantum measurement information, and provide a classical call response including a result of the execution of the classical function based at least in part on the quantum measurement information.

In various embodiments, the at least one classical computing engine is configured to execute quantum-assisted classical algorithms, generate and provide quantum function calls, receive quantum call responses, and to use the quantum call responses in the execution of the quantum-assisted classical algorithm. In various embodiments, the one or more real time engines are configured to receive a quantum function call, cause the quantum processor to execute a quantum circuit based at least in part on the quantum function call, determine a result of the quantum circuit, and generate and provide a quantum call response based on the result of the quantum circuit.

In various embodiments, a hybrid quantum-classical computing environment is an environment in which the controller (and/or one or more real time engines of the controller) of a quantum computer is configured and/or programmed to call functions, applications, programs, modules, and/or the like operating on a classical computer (e.g., on a classical processor or classical computing engine of the controller or another classical/semiconductor-based computing entity). For example, the controller of the quantum computer may use a low level embedded programming language to allow and/or enable classical callouts (e.g., to functions, applications, programs, modules, and/or the like operating on a classical computing engine) in a time frame that enables performance of quantum operations by the quantum computer within the coherence time of the quantum states of the qubits of the quantum computer.

In various embodiments, the hybrid quantum-classical computing environment enables the controller to call a function, application, program, module and/or the like operating on the classical computing engine and pass information regarding measurements captured by the quantum processor (e.g., syndrome measurements, (see U.S. Application No. 63/368,421, filed Jul. 14, 2022, the content of which is hereby incorporated by reference in its entirety), qubit measurements/readings, and/or the like). For example, during the performance of a quantum algorithm or circuit, the controller causes quantum measurements to be captured. The real time engines of the controller call a function, application, program, module and/or the like operating on the classical computing engine (also referred to herein as the "classical function") and passes information regarding the quantum measurements to be provided to the classical function. Upon receipt of the classical function call and information regarding the quantum measurements, the classical function processes the information regarding the quantum measurements captured by the quantum computer. The classical function then generates and provides a classical call response. In various embodiments, the classical call response comprises a an integer, a float, a string, and/or the like. The real time engines of the controller receive the classical call response and process the classical call response. In various embodiments, the real time engines of the controller may use the classical call response (e.g., the content thereof) to adjust and/or modify one or more subsequent actions performed by the quantum computer.

In various embodiments, the hybrid quantum-classical computing environment enables quantum circuit compilation improvements such that quantum algorithms and/or circuits are capable of being performed in smaller amounts of time.

In various embodiments, the classical function is a real-time quantum error decoder. For example, the classical function call may pass one or more quantum measurements that are syndrome measurements to the classical function. The one or more syndrome measurements correspond to and/or represent one or more interactions (e.g., between two or more qubits, between one or more qubits and various components/electric and/or magnetic fields/manipulation signals of the quantum computer, and/or the like) caused as part of the performance of the quantum circuit and/or algorithm. The classical function may then determine and/or identify one or more quantum errors that are or are not present in the interactions and provide a classical call response including an appropriate indication of the quantum errors that are or are not present in the interactions to the real time engines of the controller. The controller may then perform one or quantum error corrections (e.g., performing additional gates, modified gates, and/or the like) based on the classical call response.

In various embodiments, the classical function is a convergence monitoring function. For example, the classical function may determine when the results of the quantum algorithm and/or circuit have converged to an appropriate level of convergence or have satisfied one or more convergence criteria. For example, the controller may determine that performance of a quantum circuit and/or algorithm by the quantum computer is complete in response to an indication of whether the results of the quantum algorithm and/or circuit have converged to the appropriate level of convergence or have satisfied the one or more convergence criteria as indicated by the classical call response.

For example, in an example embodiment, the classical function is configured to return a classical call response that includes a Boolean (e.g., True/False). For example, the Boolean indicates whether the results of the quantum algorithm and/or circuit have converged to the appropriate level of convergence or have satisfied the one or more convergence criteria, in an example embodiment. For example, the quantum algorithm and/or circuit is partitioned into portions and/or shots (e.g., where each time the circuit is performed is referred to as a shot). After performance of each portion and/or shot, quantum measurements captured by the quantum computer as part of performing the respective portion or shot (or information corresponding thereto) are provided to a classical function (e.g., via a classical function call). The classical function tracks and/or monitors the information across the portions or shots. For example, the classical function may execute a routine or check upon the receipt of each classical function call providing information regarding quantum measurements captured by the quantum computer as part of a respective portion or shot to determine whether the results of the quantum algorithm and/or circuit have converged to the appropriate level of convergence or have satisfied the one or more convergence criteria (or other stopping criteria). The classical computing engine executes the classical function and then returns the classical call response including the appropriate and/or determined Boolean. The real time engines of the controller receive the classical call response, process the Boolean therein, and proceed to control various components of the quantum computer accordingly. For example, the real time engines of the controller cause the quantum processor to continue performing the quantum algorithm or circuit (or a sub-part thereof that is being iterated) when the Boolean indicates that the results of the quantum algorithm and/or circuit (or a sub-part thereof that is being iterated) have not converged to the appropriate level of convergence or have not satisfied the one or more convergence criteria (or other stopping criteria). In another example, the real time engines of the controller cause the quantum processor to cease or stop performing the quantum algorithm and/or circuit (or a sub-part thereof that is being iterated) when the Boolean indicates that the results of the quantum algorithm and/or circuit (or a sub-part thereof that is being iterated) have converged to the appropriate level of convergence or have satisfied the one or more convergence criteria (or other stopping criteria).

In various embodiments, the quantum algorithm and/or circuit is a variational quantum algorithm (VQA). One example of a VQA is a variational quantum eigen solver (VQE), though various embodiments may relate to and/or use various other VQAs. In various embodiments, the controller is configured to determine a parameter to be used in the performance of the VQA in real-time in response to quantum measurements captured during performance of a previous portion of the quantum algorithm and/or circuit. For example, a classical function call is used to pass the quantum measurements and/or information corresponding thereto to a classical computing engine. The classical computing engine executes the classical function based on the classical function call and then determines and provides a classical call response. The real time engines of the controller receive the classical call response and update and/or set the parameter then used to perform an upcoming portion of the quantum algorithm and/or circuit based on the classical call response.

In various embodiments, the real time engines of the controller are configured and/or programmed to update, modify, and/or set one or more parameters of a gate to be performed on one or more qubits based on the classical call response (and/or content thereof). For example, the real time engines may control one or more laser drivers, one or more active optical components, and/or one or more voltage source drivers to cause a gate to be performed with a particular set of parameters. For example, in an example embodiment, the quantum algorithm and/or circuit is a VQE that uses arbitrary angle gates. The classical call response may provide a value that is used to update, modify, and/or set the angle of one or more arbitrary angle gates during the performance of the quantum algorithm and/or circuit, for a next performance (e.g., next shot) of the quantum algorithm and/or circuit, and/or for another quantum algorithm and/or circuit. For example, the angle of an arbitrary gate may correspond to an intensity or length of time for which one or more laser beams are provided to a target location where one or more qubits on which the gate is being performed are located. For example, the angle of an arbitrary angle gate may be set, modified, and/or updated during the performance of a quantum algorithm and/or circuit based on mid-circuit quantum measurements and the use of the quantum-classical computing environment. For example, the real time engines may modify, set, and/or update the manner with which one or more laser drivers, active optical elements, and/or voltage source drivers are operating to control the performance of the arbitrary angle gate.

In an example embodiment, the classical call response provides the angle to be used in the arbitrary angle gate. In an example embodiment, the classical call response provides an index value that indexes the angle to be used by a gate. For example, a gate may be configured to be performed for an angle a based on a function result b that takes the classical call response (or content thereof) as input such that if $a=v_1$ or is in a range $v_0 \leq a < v_1$, the gate is performed for a first angle (e.g., to accomplish a qubit rotation of a first angle) and if $a=v_2$ or is in a range $v_1 \leq a < v_2$, the gate is performed for a second angle (e.g., to accomplish a qubit rotation of a second angle), where the first angle and the second angle are different from one another.

In another example, parameterized single and/or multiple (e.g., two) qubit gates are implemented by expanding $R_{ZZ}(\theta)$ gates in terms of $ZZ_{max}$, $R_Z(\theta)$ $ZZ_{Max}$, and general single qubit gates are implemented by expanding the gates in terms of their respective Euler decompositions with Hadamard gates inserted to provide the respective Euler decompositions in terms of (only) $R_Z(\theta)$. The binary expansion and/or representation of the angle $\theta$, which is a set of integers/binary digits, is determined. Each $R_Z(\theta)$ gate is decomposed into a set of $R_Z(\theta)$, one for each digit of the binary expansion of the angle $\theta$, that is conditioned/selected based on the binary digits of the angle $\theta$. The angle $\theta$ and/or the binary representation of the angle $\theta$ is received by the real time engines of the controller as part of a classical call response.

In an example embodiment, the real time engines of the controller provide a classical function call corresponding to a classical function and provides quantum measurement information to the classical function via the classical function call. The classical function may then update a parameter file (e.g., a JSON file and/or the like) that is referenced by the real time engines of the controller during the performance of one or more functions of the quantum computer. For example, the parameter file may provide parameters used by the real time engines of the controller to control one or more voltage sources, manipulation sources, and/or the like of the quantum computer to cause performance of one or more functions of the quantum computer (e.g., qubit reading, gating of qubits, transportation of qubits, cooling, and/or the like).

In various embodiments, the hybrid quantum-classical computing environment is used to determine one or more parameters of a quantum algorithm and/or circuit based on quantum measurements captured during the performance of the quantum algorithm and/or circuit. For example, the classical function may receive information regarding quantum measurements captured by the quantum computer during performance of the quantum algorithm and/or circuit (e.g., via a classical function call) and determine a number of iterations for performing a particular sub-part of the quantum algorithm and/or circuit based thereon. The classical function may then provide a classical call response indicating the number of iterations such that the real time engines of the controller receive the classical call response and cause the quantum processor to preform the indicated number of iterations of the particular sub-part of the quantum algorithm and/or circuit based thereon.

In various embodiments, the hybrid quantum-classical computing environment is used to provide improvements and/or to speed up classical computations. For example, a classical computing engine may be performing a classical computation and generate and provide a quantum function call. The real time engines of the controller of the quantum computer receive the quantum function call, cause performance of a quantum circuit, capture quantum measurements based on the performance of the quantum circuit, and provide the quantum measurements as part of a quantum call response. The classical computing engine receives the quantum call response and continues performing the classical computation based on the quantum call response. For example, quantum computers are expected to be faster and/or more efficient (compared to classical/semiconductor-based computers) at handling particular types of problems or calculations. If a classical computation includes a calculation that would be faster or more efficient to perform with a quantum computer, the classical computing engine may generate and provide the quantum function call to take advantage of the improved performance provided by the quantum computer. In another example, if a classical computation includes a calculation for which a quantum computer would provide a more accurate and/or precise result, the classical computing engine may generate and provide the quantum function call to take advantage of the improved performance provided by the quantum computer.

The controller of a quantum computer includes one or more real time engines configured to execute compiled executable instructions that cause real time control of various components of the quantum processor. For example, execution of the executable instructions by the one or more real time engines causes the one or more real time engines to control operation of one or more laser drivers, one or more voltage source drivers, one or more active optical components (e.g., modulators, etc.), magnetic field sources, vacuum drivers, cooling system drivers, and/or the like to cause the quantum processor to perform one or more operations on one or more qubits and/or to control the environment experienced by the one or more qubits. To cause the performance of various operations performed by lasers and voltage sources, for example, to be properly timed all of the one or more real time engines are synchronized in time and communicate with one another in a synchronous manner. For example, an operation may include causing two laser beams to be incident on a target location at the same time. Therefore, the operation of the two laser drivers must be performed (by the one or more real time engines) in a time synchronized manner.

However, given the speed and time synchronized manner with which the real time engines are required to operate, the real time engines are not configured for dynamic memory allocation or performance of more complex algorithms that may require more than a particular time to perform. For example, the real time engines may not be able to execute a QEC decoder and/or perform other classical algorithms that may enable the quantum computer to operate more efficiently, correct/mitigate errors, and/or the like. Therefore, technical problems exist in the technical field of quantum computer controllers.

Additionally, some algorithms or sub-algorithms are not efficiently performed by classical computers. For example, prime factorization of large numbers is a challenging problem for classical computers. However, some of these problems that are challenging for classical computers should be efficiently performed by quantum computers. Therefore, there exist technical challenges regarding how to take advantage of the capabilities of quantum computing to improve the performance of classical computers.

Various embodiments provide technical solutions to these technical problems. For example, various embodiments enable the real time engines of a quantum computer controller to communicate with a classical computing engine such that function calls and responses can be communicated back and forth. For example, the executable instructions being executed by the real time engines may cause a real time engine to generate a classical function call including quantum measurement information and provide the classical function call to a classical computing engine. The classical computing engine may execute a classical function corresponding to the classical function call based at least in part on the quantum measurement information and provide a classical call response including a result of execution of the classical function. The real time engines may receive the classical call response and control the quantum processor based at least in part on the result of the execution of the classical function as indicated by the classical call response. In various embodiments, a classical computing engine may be executing program code and/or the like that causes the classical computing engine to generate a quantum function call and provide the quantum function call. The real time engines of the controller receive the quantum function call and cause the quantum processor to perform a quantum algorithm and/or circuit based thereon. The controller determines quantum measurement information based on the performance of the quantum algorithm and/or circuit and provides a quantum call response including the quantum measurement information. The classical computing engine receives the quantum call response and continues execution of the program code and/or the like based at least in part on the quantum measurement information included in the quantum call response. Therefore, various embodiments improve the function of a quantum computer and/or classical computer.

II. Example Quantum Computer

Various embodiments provide a hybrid quantum-classical computing environment. A schematic diagram of an example hybrid quantum-classical computing environment is illustrated in FIG. 1.

In various embodiments, the hybrid quantum-classical computing environment 100 comprises a classical computing entity 10 and a quantum computer 110. In various embodiments, the quantum computer 110 comprises a controller 30 and a quantum processor 115. In various embodiments, the quantum processor 115 comprises a quantum object confinement apparatus 70 enclosed in a cryostat and/or vacuum chamber 40, one or more voltage sources 50, one or more manipulation sources 60, one or more magnetic field generators, one or more photodetectors, one or more sensors, and/or the like.

The illustrated example hybrid quantum-classical computing environment 100 comprises a quantum object confinement apparatus 70 (e.g., an ion trap, surface trap, Paul trap, and/or the like), in accordance with an example embodiment. For example, the quantum object confinement apparatus 70 is configured to confine one or more quantum objects. For example, the quantum objects may be neutral or ionic atoms; neutral, ionic, or multipolar molecules; quantum dots; or other quantum objects that are confinable and have manipulatable quantum states. In various embodiments, the quantum objects are used as qubits of the quantum processor 115. Some non-limiting example quantum object confinement apparatuses (also referred to herein as atomic object confinement apparatuses and/or confinement apparatuses) are described by U.S. Pat. No. 11,037,776, issued Jun. 15, 2021; U.S. application Ser. No. 17/533,587, filed Nov. 23, 2021; and U.S. application Ser. No. 17/810,082, filed Jun. 30, 2022, the contents of which are incorporated by reference in their entireties herein.

In an example embodiment, the one or more manipulation sources 60 comprise one or more lasers (e.g., optical lasers, microwave sources, and/or the like). In various embodiments, the one or more manipulation sources 60 are configured to manipulate and/or cause a controlled quantum state evolution of one or more quantum objects confined by the quantum object confinement apparatus 70. For example, the one or more manipulation sources 60 comprise respective manipulation sources 60 configured to generate and provide respective manipulation signals to respective target locations defined at least in part by the quantum object confinement apparatus 70 via respective beam path systems 66 (e.g., 66A, 66B, 66C). In an example embodiment, at least some of the manipulation signals are laser beams, laser pulse trains, and/or the like. For example, in an example embodiment, wherein the one or more manipulation sources 60 comprise one or more lasers, the lasers may provide one or more laser beams to the confinement apparatus within the cryostat and/or vacuum chamber 40 via respective beam path systems 66. The laser beams may be used to perform various operations (e.g., parallel operations), such as enacting one or more quantum gates on one or more qubits and/or quantum objects, sympathetic cooling of one or more quantum objects, reading a qubit and/or determining a quantum state of a quantum object, initializing a quantum object into the qubit space, and/or the like. In various embodiments, the manipulation sources 60 are controlled by respective driver controller elements 215 (see FIG. 2) of the controller 30.

In various embodiments, the quantum computer 110 comprises one or more voltage sources 50. For example, the voltage sources 50 may comprise a plurality of direct current (DC) voltage drivers and/or voltage sources and/or at least one radio frequency (RF) driver and/or voltage source. The voltage sources 50 may be electrically coupled to corresponding potential generating elements (e.g., electrodes) of the quantum object confinement apparatus 70, in an example embodiment. For example, the voltage sources 50 are configured to provide (RF) oscillating voltage signals to the RF rail electrodes of the quantum object confinement apparatus 70. For example, the voltage sources 50 are configured to provide controlling voltage signals to the control electrodes of quantum object confinement apparatus 70. In various embodiments, the voltages sources 50 are controlled by respective driver controller elements 215 of the controller 30.

In various embodiments, the quantum computer 110 comprises one or more magnetic field generators. For example, the magnetic field generator may be an internal magnetic field generator disposed within the cryogenic and/or vacuum chamber 40 and/or an external magnetic field generator disposed outside of the cryogenic and/or vacuum chamber 40. In various embodiments, the magnetic field generators are permanent magnets, Helmholtz coils, electrical magnets, and/or the like. In various embodiments, the magnetic field generators are configured to generate a magnetic field at one or more regions of the quantum object confinement apparatus 70 that has a particular magnitude and a particular magnetic field direction in the one or more regions of the quantum object confinement apparatus 70. In an example embodiment, the particular magnitude is in a range of 2-5 Gauss. In an example embodiment, operation of the one or more magnetic field generators is controlled by the controller 30 (e.g., via a respective driver controller element 215). In an example embodiment, at least one of the magnetic field generators is a permanent magnet and therefore is not controlled by the controller 30.

In various embodiments, a classical computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum circuits, quantum computing algorithms, and/or the like into a computing language, executable instructions, command sets, and/or the like that the controller 30 can understand and/or implement. In various embodiments, the classical computing entity 10 is configured to enable a user to program quantum assembly (QASM) and/or quantum intermediate representation (QIR) code that is compiled to generate the executable instructions executed by the real time engines of the controller 30. In various embodiments, the classical computing entity is configured to enable a user to program classical algorithms that are compiled in web assembly (WASM) executable program code, for example, for execution by a classical computing engine. In an example embodiment, the classical computing engine is part of the processing device 205 of a controller 30. In an example embodiment, the classical computing engine is part of the processing device 808 (see FIG. 8) of the classical computing entity 10.

In various embodiments, compiling the classical algorithms into WASM executable program code enables a sandboxed implementation of the classical algorithms. For example, a user is prevented from causing execution of program code that affects the hardware negatively or performs any sort of attack on security of the hybrid quantum-classical computing environment 100. Additionally, compiling the classical algorithms into WASM executable program code provides a portable program representation format of the program code that is independent of a particular processor or central processing unit (CPU). This enables users to program in different languages and also not worry about what kind of hardware will be executing the program code. Moreover, WASM is low-level and built for performant execution, and thus providing for an easy to transmit and execute format of program code with good performance for time-sensitive applications, such as quantum error correction (QEC) and/or the like.

In various embodiments, the controller 30 is configured to control the voltage sources 50, cryogenic system and/or vacuum system controlling the temperature and pressure within the cryostat and/or vacuum chamber 40, manipulation sources 60, magnetic field generators, and/or other systems controlling various environmental conditions (e.g., temperature, pressure, and/or the like) within the cryostat and/or vacuum chamber 40 and/or configured to manipulate and/or cause a controlled evolution of quantum states of one or more quantum objects confined by the quantum object confinement apparatus 70. For example, the controller 30 may cause a controlled evolution of quantum states of one or more quantum objects within the quantum object confinement apparatus 70 to execute a quantum circuit and/or algorithm.

III. Example Controller

In various embodiments, a quantum computer 110 comprises a controller 30 configured to control various elements and/or components of the quantum computer 110. For example, the controller 30 comprises one or more processing devices 205 configured to execute executable instructions to control the operation of one or more driver controller elements 215. The one or more driver controller elements 215 are configured to control the operation of respective voltage sources 50, manipulation sources 60, cryogenic and/or vacuum system components, magnetic field generators, and/or the like. For example, the controller 30 may be configured to control the voltage sources 50, a cryogenic system and/or vacuum system controlling the temperature and pressure within the cryostat and/or vacuum chamber 40, manipulation sources 60, magnetic field generators 80, and/or other systems controlling the environmental conditions (e.g., temperature, humidity, pressure, and/or the like) within the cryostat and/or vacuum chamber 40 and/or configured to manipulate and/or cause a controlled evolution of quantum states of one or more quantum objects confined by the quantum object confinement apparatus 70.

As shown in FIG. 2, in various embodiments, the controller 30 may comprise various controller elements including processing elements and/or devices 205, memory 210, driver controller elements 215, a communication interface 220, analog-digital converter elements 225, and/or the like. For example, the processing elements and/or devices 205 comprises one or more real time engines and/or classical computing engines. For example, the processing elements and/or devices 205 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. For example, the real time engines (RTEs) 310 and/or classical computing engines (CCEs) 320 (see FIG. 3) may be and/or comprise CPLDs, microprocessors, compressing entities, ASICs, FPGAs, PLAs, and/or other processing devices and/or circuitry. The term circuitry may refer to an entirely hardware embodiment or a combination of hardware and computer program products. In an example embodiment, the processing element and/or device 205 of the controller 30 comprises a clock and/or is in communication with a clock. For example, the real time engines may be time synchronized based on the clock.

In various embodiments, the processing element and/or device 205 is configured to execute executable instructions to cause the driver controller elements 215 to control operation of respective drivers to cause the quantum processor 115 to perform a quantum circuit. In various embodiments, performance of the quantum circuit includes the generation of one or more classical function calls and receipt of corresponding classical call responses and/or are performed based on receipt of a quantum function call.

For example, the memory 210 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 210 may store qubit records corresponding the qubits of quantum computer (e.g., in a qubit record data store, qubit record database, qubit record table, and/or the like), one or more functional representations of the manipulation signal power, frequency, duration, and/or combination thereof as a function of an input signal (e.g., input signal parameter value(s)) provided to a modulator configured to condition a respective manipulation signal, a calibration table, an executable queue, computer program code (e.g., in a one or more computer languages, specialized controller language(s), and/or the like), one or more libraries, one or more waveform series for forming controlling voltage signals for controlling the transportation of atomic objects along one dimensional trapping regions and through junctions connecting one dimensional trapping regions and associated meta data, and/or the like. In an example embodiment, a qubit record corresponding to a respective qubit tracks the phase of the respective qubit, any AC Stark shift imparted thereto, the result of any software gates to the phase of the qubit, and/or the like. In an example embodiment, execution of at least a portion of the computer program code stored in the memory 210 (e.g., by a processing element and/or device 205) causes the controller 30 to perform one or more steps, operations, processes, procedures and/or the like described herein for tracking the phase, location, and/or the like of quantum object and/or multi-quantum object crystal confined by the confinement apparatus 70 and causing the adjustment of the phase of one or more manipulation sources 60 and/or signal(s) generated thereby.

In various embodiments, the driver controller elements 215 may include one or more drivers and/or controller elements each configured to control one or more drivers. In various embodiments, the driver controller elements 215 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element and/or device 205). In various embodiments, the driver controller elements 215 may enable the controller 30 to operate a manipulation source 60, voltage sources 50, magnetic field generators, and/or the like. In various embodiments, the drivers may be laser drivers; vacuum component drivers; drivers for controlling the flow of current and/or voltage applied to control electrodes, RF rail electrodes, RF bus electrodes, and/or other electrodes used for maintaining and/or controlling the magnetic field at various regions of the quantum object confinement apparatus 70, maintaining and/or controlling the trapping potential of the quantum object confinement apparatus 70, and/or causing transport of one or more quantum objects; cryogenic and/or vacuum system component drivers; and/or the like. For example, the drivers may control and/or comprise DC and/or RF voltage drivers and/or voltage sources 50 that provide voltages and/or electrical signals (e.g., oscillating voltage signals and/or controlling voltage signals) to the potential generating elements (e.g., electrodes) of the confinement apparatus 70.

In various embodiments, the controller 30 comprises means for communicating and/or receiving signals from one or more optical receiver components such as photodetectors, cameras, MEMs cameras, CCD cameras, photodiodes, photomultiplier tubes, sensors, and/or the like of an optics collection system configured to capture, detect, measure, and/or the like optical signals generated by quantum objects confined by the quantum object confinement apparatus 70. For example, the controller 30 may comprise one or more analog-digital converter elements 225 configured to receive signals from one or more optical receiver components, calibration sensors, and/or the like.

In various embodiments, the controller 30 may comprise a communication interface 220 for interfacing and/or communicating with a computing entity 10. For example, the controller 30 may comprise a communication interface 220 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

In various embodiments, as illustrated in FIG. 3, the processing elements and/or devices 205 of the controller 30 comprise one or more real time engines (RTEs) 310 (e.g., 310A, 310B, 310C, 310D). In various embodiments, the processing elements and/or devices 205 of the controller comprise one or more classical computing engines (CCEs) 320. In various embodiments, the RTEs 310 communicate with one another in a time synchronous manner and the RTEs communicate with the CCE 320 in an asynchronous manner. For example, the RTEs 310 and CCE 320 communicate with one another via a bus network 315, in an example embodiment. In various embodiments, each RTE 310 and CCE 320 comprises and/or is associated with a respective memory 210. For example, in various embodiments, each RTE 310 and/or CCE 320 is a respective processing card and/or printed circuit board comprising (semiconductor-based) processing and memory components.

In various embodiments, at least one of the RTEs is configured to perform real time compilation of device function library (DFL) (e.g., via a hardware specific compiler) program code into real time (RT) binary and/or machine level executable instructions. One or more RTEs execute the RT binary and/or machine level executable instructions, in a time synchronized manner, to cause the driver controller elements 215 to control operation of respective drivers. For example, the operation of the respective drivers are controlled such that the voltage sources 50, manipulation sources 60, and/or other quantum processor 115 components cause the performance of various operations of the quantum processor 115 (e.g., performing single qubit gates, performing two qubit gates, initialization of quantum objects into a qubit space, performing qubit reading and/or measurement operations, transporting qubits between target locations defined by the confinement apparatus 70, and/or the like).

IV. Example Data Flow

FIG. 4 provides a data flow diagram illustrating the process of the generation through execution of the executable instructions executed by the RTEs 310 and the program code executed by the CCE 320. In various embodiments, some steps of the generation of the executable instructions and the program code are performed during a preparation time period 410, which occurs prior to the performance of the quantum algorithm or circuit by the quantum computer 110 or prior to the performance of the classical algorithm by a CCE of the classical computing entity 10 (e.g., processing element and/or device 808) and/or the CCE 320 of the controller 30. In various embodiments, the executable instructions are compiled into RT binary and/or machine level executable instructions in real time and/or during the performance of a quantum algorithm and/or circuit by the quantum computer 110.

For example, a user may interact with a user interface of a classical computing entity 10 to prepare, write, or program a quantum circuit written in a quantum programming language 412. For example, the quantum circuit may be prepared by the user in QASM, QIR, or another quantum programming language. In various embodiments, the quantum programming language is hardware agnostic. For example, the quantum circuit written in a quantum programming language 412 may be compiled to be run on various types of quantum computers (e.g., a quantum charge-coupled device (QCCD)-based quantum computer, superconducting quantum computer, photon quantum computer, neutral or Rydberg atom quantum computer, and/or the like).

In various embodiments, a user may interact with the user interface of the classical computing entity 10 to prepare, write, or program a classic compute algorithm 414. In various embodiments, the classic compute algorithm may be written in various programming languages (e.g., C or variations thereof, python, rust, Perl, javascript, and/or the like). In various embodiments, the classic compute algorithm 414 is prepared, written, or programmed to cause a CCE 320 to perform a desired classical function or algorithm.

In various embodiments, the quantum circuit written in the quantum programming language 412 and the classic compute algorithm 414 are prepared, written, and/or programmed to include respective functions calls. For example, the quantum circuit may be prepared, written, and/or programmed to include a classical function call and/or a quantum call response. In another example, the classic compute algorithm may be prepared, written, and/or programmed to include a quantum function call and/or a classical call response. In various embodiments, a classical function call, classical call response, quantum function call, and/or quantum call response is programmed in accordance with inter-component communication (ICC) standards. For example, the classical function call, classical call response, quantum function call, and/or quantum call response is programmed using ICC semantics. In various embodiments, various on the wire packet encoding is used for the classical function call, classical call response, quantum function call, and/or quantum call response semantics. In an example embodiment, a raw Layer 2 Ethernet with a custom payload layered on top for the classical function call, classical call response, quantum function call, and/or quantum call response semantics. In various embodiments, the wire packet encoding used is configured to reduce and/or minimize communication stack processing latency. For example, the custom payload layered on top of the raw Layer 2 Ethernet semantics is configured to reduce and/or minimize communication stack processing latency. In various embodiments, the quantum circuit and the classical compute algorithm are prepared, written, and/or programmed to use a standardized calling convention such that the quantum circuit and classic compute algorithm are configured to communicate with one another during execution thereof by the RTEs 310 and the CCE 320.

In various embodiments, the classic compute algorithm is compiled using an appropriate classic language compiler 416. For example, the classic language compiler 416 is configured and/or programmed to compile the classic compute algorithm prepared, written, and/or programmed in the user's choice classic programming language into a compiled classic compute algorithm 418 in the format of web assembly (WASM) program code. For example, the compiled classic compute algorithm 418 is in the form of executables that can be executed by the CCE 320. The compiled classic compute algorithm 418 is provided and stored by memory accessible to the CCE 320. For example, when the CCE is part of the processing element and/or device 808 of the classical computing entity 10, the compiled classic compute algorithm 418 is stored in memory 822, 824 of the classical computing entity 10. When the CCE 320 is part of the controller 30, the compiled classic compute algorithm 418 is provided (e.g., transmitted via one or more wired and/or wireless networks 20) by the classical computing entity 10. The controller 30 receives the compiled classic compute algorithm 418 and stores the compiled classic compute algorithm to memory 210 that is associated with the CCE 320. The CCE 320 executes the program code (e.g., WASM program code) of the compiled classic compute algorithm 418 in response to a user interacting with a user interface of the classical computing entity 10 to cause the execution thereof or in response to the CCE receiving a classical function call (e.g., during performance of a quantum circuit by a quantum computer).

In various embodiments, the quantum circuit written in the quantum programming language 412 is compiled into DFL program code 424 by a quantum programming language compiler 422. In various embodiments, DFL is a low level program format representing the fundamental quantum object transport and gating/measurement operations. For example, compiling the quantum programming language 412 version of the quantum circuit into DFL program code 424 results in hardware specific operations (e.g., fundamental operations specific to the quantum processor 115) being identified and aggregated such that the resulting DFL program code 424 includes sequences of fundamental operations that are specific to the quantum processor 115 to cause the quantum circuit to be performed by the quantum processor 115. In other words, compiling the quantum circuit written in the quantum programming language 412 into DFL program code 424 compiles the hardware agnostic quantum circuit into hardware (e.g., quantum processor 115) specific program code.

In various embodiments, the quantum programming language compiler 422 is operating on the classical computing entity 10 and the classical computing entity 10 provides (e.g., transmits via one or more wired and/or wireless networks 20) the DFL 424 such that the controller 30 receives the DFL 424. The controller 30 stores the DFL 424 to memory 210 accessible to at least one RTE 310. In an example embodiment, the classical computing entity 10 provides the quantum circuit written in the quantum programming language 412 and the quantum programming language compiler 422 is operating on the controller 30.

In various embodiments, the quantum circuit written in the quantum programming language 412 (e.g., QASM, QIR, and/or the like) is hardware agnostic. The quantum programming language compiler 422 compiles the quantum circuit into DFL 424. The DFL 424 is device-specific and includes, for example, scheduling/routing information from the quantum programming language compiler 422. For example, the DFL 424 may include transport operations to be executed on specific qubits at specific times, as well as operations on the qubits or collections/strings of qubits (split, combine, etc.) that are used as part of transport. For example, the quantum programming language compiler 422 converts the hardware agnostic quantum circuit in the quantum programming language 412 into a sequence of physical processes that will be executed for the quantum circuit and/or algorithm on a particular quantum computer.

The hardware specific compiler 426 compiles the DFL 424 into RT binary and/or machine level code 430 that is specific to the quantum computer 110. For example, the RT binary and/or machine level code 430 includes executable instructions that, when executed by respective RTEs 310 cause the RTEs 310 to control respective driver controller elements 215 to control operation of respective voltage sources 50, manipulation sources 60, and/or other components of the quantum processor 115 to cause the quantum processor to perform the quantum circuit.

In an example embodiment, the compiling of the DFL 424 by the hardware specific compiler 426 causes generation of control signal sequence instructions 428 that are provided to respective driver controller elements 215 configured to control operation of respective voltage sources 50.

In various embodiments, the hardware specific compiler 426 compiles the DFL 424 in real time with the performance of the quantum circuit by the quantum computer 110. For example, the executable instructions of the compiled RT binary and/or machine level code 430 may be provided directly to a respective RTE 310 for execution during the performance of the quantum circuit. For example, the hardware specific compiler 426 may modify which portions of quantum circuit are performed when, how many times a portion of the quantum circuit is performed, a parameter that controls how an operation is performed, and/or the like based on the content of a classical call response and/or other input received during execution of the quantum circuit.

For example, when compiling the quantum program for execution on the one or more RTEs 310, the compiler (e.g., quantum programming language compiler 422 and/or hardware specific compiler 426) ensures the function calls in the quantum program (e.g., the DFL program code 424 and/or the RT binary 430) are consistent with the functions defined in the classical program. For example, the classical language compiler 416 and the quantum programming language compiler 422 and/or hardware specific compiler 426 may be aware of one another and/or communicate with one another and/or with one or more common libraries such that functions called via a quantum function call and/or a classical function call are functions defined for the corresponding engine (e.g., RTE 310, CCE 320).

In various embodiments, the RT binary 430 includes specific demarcations to indicate what a classical function call is, using metadata and/or another technique. For example, an RTE 310 generates a classical function call that includes a function name and its arguments and then encodes the payload of the classical function call into a packet. The packet is then provided to the CCE 320 via the bus network 315. The CCE 320 receives the packet encoding the classical function call and parses the packet to determine the function to call and execute.

FIG. 5 provides an example data flow of the interaction between RTEs 310 and a CCE 320 during the performance of a quantum circuit. For example, a sender RTE 310A executes executable instructions (e.g., in the form of RT binary and/or machine level instructions) that cause the sender RTE 310A to generate and provide classical function call 510. In various embodiments, the classical function call 510 indicates a particular classical function to be called and includes quantum measurement information. In various embodiments, the controller 30 determines the quantum measurement information by reading and/or measuring the quantum state of one or more qubits of the quantum processor 115. For example, the quantum measurement information may be a string of bits that indicate the results of syndrome measurements.

The CCE 320 the program code (e.g., the compiled classic compute algorithm 418) indicated by the classical function call using the quantum measurement information as input thereto. The CCE 320 generates an output through the execution of the program code (e.g., the compiled classic compute algorithm 418) indicated by the classical function call based at least in part on the quantum measurement information that was provided as input. The CCE 320 generates a classical call response 520 (e.g., 520a, 520B) that includes the output and/or an indication thereof. In various embodiments, the output and/or indication thereof may be a single bit, a bit string, an integer, a float, a string, and/or the like.

The CCE provides the classical call response 520 such that one or more RTEs 310 receive the classical call response 520. For example, the classical function call 510 may include an indication of which RTE 310 of the controller 30 is the receiver RTE 310B for the particular classical call response 520. The CCE 320 may provide an instance of the classical call response 520B such that receiver RTE 310B receives the classical call response 520B. In an example embodiment, the CCE 320 may also provide an instance of the classical call response 520A to the sender RTE 310A that provided the classical function call 510.

In various embodiments, the classical call response 520 is a packet contains classical data (in embodiments where the response is returning data). For example, in the case of the classical call being calling a QEC decoder, the classical call response 520 may include a correction.

In some instances, a classical call response may not prompt a classical call response and the RTE(s) 310 may continue without receipt of the classical call response. For example, in some instances a CCE 320 may accumulate multiple instances of classical data provided by respective classical call responses. For example, RTEs 310 may provide a plurality of syndrome measurements via a plurality of classical function calls. The CCE 320 may then use the plurality of syndrome measurements parsed for the plurality of classical function calls to perform a classical (decoder) function. One or more determined corrections may then be provided via one or ore classical call responses.

The RTEs 310A, 310B may then exchange a time count sync value 530 to ensure the RTEs 310A, 310B remain synchronized and/or operating in a time synchronized manner.

In various embodiments, the CCE 320 is not operating in a time synchronized manner with respect to the RTEs 310. In various embodiments, the communication between the RTEs 310 is synchronous and the communication between an RTE 310 and the CCE 320 is asynchronous.

In various embodiments, the time between the provision of the classical function call 510 by the sender RTE 310A and the receipt of the classical call response 520 by the receiver RTE 310B is less than the coherence time of a qubit of the quantum processor. The coherence time of a qubit is the time that the qubit can retain the quantum information stored thereby. In an example embodiment, for example an embodiment where the classical call response 520 is used to condition performance of a next shot and/or next iteration of a quantum circuit and/or algorithm, the time between the provision of the classical function call 510 by the sender RTE 310A and the receipt of the classical call response 520 by the receiver RTE 310B may be less than, equal to, or greater than the coherence time of a qubit of the quantum processor.

V. Example Performance of a Quantum Algorithm or Circuit Including a Classical Function Call FIG. 6A illustrates various processes, procedures, operations and/or the like performed on by one or more RTEs 310 of a controller 30 to cause a quantum computer to perform a quantum algorithm or circuit that includes a classical function call. FIG. 6B illustrates various processes, procedures, operations, and/or the like performed by at least one CCE as part of the performance of a quantum algorithm or circuit by the quantum computer where the quantum algorithm or circuit includes a classical function call. In various embodiments, the CCE may be a CCE 320 that is part of the controller 30 or may be a computing entity 10 that is in communication with the controller 30.

Starting at step 602 of FIG. 6A, the one or more RTEs 310 cause the quantum processor to begin performing a quantum algorithm or circuit. For example, the RTEs 310 execute respective executable instructions that cause the RTEs 310 to control respective driver controller elements 215 to cause the quantum processor to confine respective quantum objects at respective locations defined by the confinement apparatus 70, transport respective quantum objects to respective locations defined by the confinement, initialize the quantum objects into the qubit space, and/or the like. For example, execution of the respective executable instructions by the respective RTEs 310 causes the RTEs to control respective driver controller elements 215 that cause the desired operation of the voltage sources 50, manipulation sources 60, and/or the like to perform operations of the quantum computer 110.

At step 604, as part of performing the quantum algorithm or circuit, the one or more RTEs 310 cause one or more quantum measurements to be captured. For example, the one or more RTEs 310 may cause the quantum processor to perform one or more reading and/or measurement operations to determine, measure, and/or read the quantum state of one or more qubits. For example, the RTEs 310 may control operation of a manipulation source 60 to cause a manipulation signal (e.g., laser beam) to be incident on a respective location defined at least in part by the confinement apparatus 70 such that the manipulation signal is incident on a quantum object located at the respective location. A photodetector provides a signal to the controller 30 (e.g., via AD converter element 225) that provides an indication of whether the quantum object fluoresced in response to the manipulation signal being incident thereon or not. Based on the signal provided by the photodetector, the one or more RTEs 310 determine the quantum state of the quantum object. In an example embodiment, the quantum measurement information includes an indication of the determined quantum state of the quantum object. In an example embodiment, the quantum measurement information includes indications of the respective determined quantum states of a plurality of quantum objects.

At step 606, a sender RTE 310A of the one or more RTEs 310 generates and provide a classical function call 510. For example, an RTE 310 executes an executable instruction that causes the RTE 310 to generate a classical function call 510 that includes an indication of a classical function to be performed, the quantum measurement information, and, possibly, a receiver RTE 310B to which the resulting classical call response 520B should be provided. The sender RTE 310A sends the classical function call 510 via the bus network 315 such that the CCE 320 receive the classical function call 510, in an example embodiment.

At step 612 of FIG. 6B, the CCE 320 receives the classical function call 510. Based on the classical function call 510, the CCE 320 accesses the compiled classical compute algorithm 418 from the memory associated with the CCE 320. In an example embodiment, the CCE 320 extracts the quantum measurement information from the classical function call 510.

At step 614, the CCE 320 executes the program code of the compiled classical compute algorithm 418 to cause the CCE 320 to perform the classical algorithm or function based at least in part on the quantum measurement information. For example, the CCE 320 executes the program code of the compiled classical compute algorithm 418 and provides the quantum measurement information as input. Execution of the program code causes the CCE 320 to generate an output or a result.

At step 616, the CCE 320 generates the classical call response 520 including the output or result of the performance of the classical algorithm or function (or an indication thereof). The CCE 320 then provides the classical call response 520 to one or more RTEs 310. For example, the CCE 320 provides the classical call response 520 to a receiver RTE 310B indicated in the classical function call 510 and/or a sender RTE 310A that provided the classical function call 510. For example, the CCE 320 provides the classical call response 520 via the bus network 315.

Returning to FIG. 6A, at step 608, one or more RTEs 310 receive the classical call response 520. In an example embodiment, an RTE 310 extracts the output and/or result of the performance of the classical algorithm or function (or the indication thereof) from the classical call response 520.

At step 610, the one or more RTEs 310 controls operation of the quantum processor 115 based at least in part on the classical call response 520. For example, the output and/or result of the performance of the classical algorithm or function (or the indication thereof) to determine whether or not a condition has been met, which circuit portion should be performed next, how a circuit portion should be performed, and/or the like. For example, the classical algorithm or function may be a QEC decoder and the output and/or result of the performance of the classical algorithm or function (or the indication thereof) may be one or more corrections that should be performed or tracked by the controller 30 to correct errors present in the performance of the quantum circuit. In another example, the classical algorithm or function may be used to determine whether a convergence requirement has been met. For example, the quantum computer may iteratively repeat performance of the quantum circuit or a portion thereof until the convergence requirement has been met. After each iteration (or after a set of iterations) of the quantum circuit or the portion thereof, quantum measurement information is provided to the classical algorithm or function (e.g., via a classical function call) and the output or result provided via the classical call response indicates whether the convergence requirement has been met and the quantum computer should stop iterating the quantum circuit or portion thereof, or whether the convergence requirement has not been met and the quantum computer should continue iterating the quantum circuit or portion thereof. In an example embodiment, the classical algorithm or function determines an angle of rotation to be used in performance of a particular quantum logic gate and/or the like and the RTEs may then control one or more manipulations sources 60 to cause the particular quantum logic gate to be performed with the determined angle of rotation. As should be understood, the quantum circuit is programmed to use the result or output of the classical algorithm or function provided via the classical call response as input.

In various embodiments, a plurality of classical function calls are generated and provided by the one or more RTEs 310 during the performance of a quantum algorithm or circuit. In various embodiments, the classical function calls and classical call responses are generated and provided during operation of a quantum circuit (e.g., during operation of the quantum processor). In various embodiments, the classical function calls and classical call responses are generated and provided while the quantum processor is not being operated. For example, the classical function calls and classical call responses may be generated and provided between performances (e.g., iterations or shots) of the quantum algorithm or circuit being performed by the quantum processor.

VI. Example Performance of a Classical Algorithm Including a Quantum Function Call In various a classical computing entity 10 and/or a CCE 320 of a controller 30 may perform a quantum-assisted classical algorithm. A quantum-assisted classical algorithm is a classical algorithm that includes one or more quantum function calls. For example, the quantum function calls may be configured to take advantage of the strengths of a quantum computer so as to provide an overall faster or less computationally expensive result to the classical algorithm.

FIG. 7A illustrates various processes, procedures, operations and/or the like performed on by at least one CCE to cause a performance of a classical algorithm that includes a quantum function call. FIG. 7B illustrates various processes, procedures, operations, and/or the like performed by one or more RTEs 310 as part of the performance of a classical algorithm by the CCE where the classical algorithm includes a quantum function call. In various embodiments, the CCE may be a CCE 320 that is part of the controller 30 or may be a computing entity 10 that is in communication with the controller 30.

Starting at step 702 of FIG. 7A, the at least one CCE executes the program code of the compiled classic compute algorithm 418 to cause the CCE to begin performing a classical algorithm.

At step 704, the CCE generates and provides a quantum function call. For example, the CCE executes a portion of the program code that causes the CCE to generate a quantum function call that includes an indication of a quantum function to be performed, and one or more quantum function inputs. For example, in an example embodiment, the quantum function is determination of the occupation of a set of electron orbits of an atom or molecule under particular conditions. The one or more quantum function inputs may include information regarding the atom or molecule, set of electron orbits of interest, and/or the particular conditions. For example, the quantum function inputs may correspond to a Hamiltonian describing a physical system of interest. In another example embodiment, the quantum function is configured to determine a prime factorization of a number and the one or more quantum function inputs include the number to be factorized. As should be understood, various quantum functions may be called via a quantum function call and the one or more quantum function inputs may be tailored to the particular quantum function being called. For example, when the CCE is part of the classical computing entity 10, the CCE causes the quantum function call to be provided via the network interface 820 of the classical computing entity.

At step 712 of FIG. 6B, one or more RTEs 310 receive the quantum function call. For example, the one or more RTEs 310 may receive the quantum function call via communication interface 220 of the controller. Based on the quantum function call, the RTEs 310 accesses the DFL 424 and begin compiling the DFL 424 using a real time, hardware specific compiler 426, in an example embodiment.

At step 714, the one or more RTEs 310 control operation of the voltage sources 50, manipulation sources 60, and/or other components of the quantum processor to perform one or more quantum circuits corresponding to the quantum function corresponding to the quantum function call.

At step 716, as part of performing the one or more quantum circuits corresponding to the quantum function, the one or more RTEs 310 cause the quantum computer 110 to perform one or more reading and/or measurement operations and determine quantum measurement information based thereon. For example, the one or more RTEs 310 may cause the quantum processor to perform one or more reading and/or measurement operations to determine, measure, and/or read the quantum state of one or more qubits. For example, the RTEs 310 may control operation of a manipulation source 60 to cause a manipulation signal (e.g., laser beam) to be incident on a respective location defined at least in part by the confinement apparatus 70 such that the manipulation signal is incident on a quantum object located at the respective location. A photodetector provides a signal to the controller 30 (e.g., via AD converter element 225) that provides an indication of whether the quantum object fluoresced in response to the manipulation signal being incident thereon or not. Based on the signal provided by the photodetector, the one or more RTEs 310 determine the quantum state of the quantum object. In an example embodiment, the quantum measurement information includes an indication of the determined quantum state of the quantum object. In an example embodiment, the quantum measurement information includes indications of the respective determined quantum states of a plurality of quantum objects. For example, the quantum measurement information provides a result or an output of the quantum function.

At step 718, at least one of the one or more RTEs 310 generates a quantum call response including the quantum measurement information. The RTE 310 provides the quantum call response such that the CCE receives the quantum call response. For example, the RTE 310 may cause the communication interface 220 to provide the quantum call response such that the CCE of the classical computing entity 10 receives the quantum call response, in an example embodiment.

Returning to FIG. 7A, at step 706, the CCE receives the quantum call response. In an example embodiment, the CCE receives the quantum call response via the network interface 820 of the classical computing entity 10. In an example embodiment, the CCE extracts the output and/or result of the performance of the quantum function (or the indication thereof) from the quantum call response. For example, the CCE may extract the quantum measurement information from the quantum call response.

At step 708, the CCE continues performing the classical algorithm based at least in part on the output and/or result of the performance of the quantum function (e.g., the quantum measurement information). For example, the CCE provides the output and/or result of the performance of the quantum function (e.g., the quantum measurement information) as input as that is used as the CCE continues to execute the program code of the compiled classic compute algorithm 418.

In various embodiments, a plurality of quantum function calls are generated and provided by the CCE during the performance of a classical algorithm.

VII. Technical Advantages

The controller of a quantum computer includes one or more real time engines configured to execute compiled executable instructions that cause real time control of various components of the quantum processor. For example, execution of the executable instructions by the one or more real time engines causes the one or more real time engines to control operation of one or more laser drivers, one or more voltage source drivers, one or more active optical components (e.g., modulators, etc.), magnetic field sources, vacuum drivers, cooling system drivers, and/or the like to cause the quantum processor to perform one or more operations on one or more qubits and/or to control the environment experienced by the one or more qubits. To cause the performance of various operations performed by lasers and voltage sources, for example, to be properly timed all of the one or more real time engines are synchronized in time and communicate with one another in a synchronous manner. For example, an operation may include causing two laser beams to be incident on a target location at the same time. Therefore, the operation of the two laser drivers must be performed (by the one or more real time engines) in a time synchronized manner.

However, given the speed and time synchronized manner with which the real time engines are required to operate, the real time engines are not configured for dynamic memory allocation or performance of more complex algorithms that may require more than a particular time to perform. For example, the real time engines may not be able to execute a QEC decoder and/or perform other classical algorithms that may enable the quantum computer to operate more efficiently, correct/mitigate errors, and/or the like. Therefore, technical problems exist in the technical field of quantum computer controllers.

Additionally, some algorithms or sub-algorithms are not efficiently performed by classical computers. For example, prime factorization of large numbers is a challenging problem for classical computers. However, some of these problems that are challenging for classical computers should be efficiently performed by quantum computers. Therefore, there exist technical challenges regarding how to take advantage of the capabilities of quantum computing to improve the performance of classical computers.

Various embodiments provide technical solutions to these technical problems. For example, various embodiments enable the real time engines of a quantum computer controller to communicate with a classical computing engine such that function calls and responses can be communicated back and forth. For example, the executable instructions being executed by the real time engines may cause a real time engine to generate a classical function call including quantum measurement information and provide the classical function call to a classical computing engine. The classical computing engine may execute a classical function corresponding to the classical function call based at least in part on the quantum measurement information and provide a classical call response including a result of execution of the classical function. The real time engines may receive the classical call response and control the quantum processor based at least in part on the result of the execution of the classical function as indicated by the classical call response. In various embodiments, a classical computing engine may be executing program code and/or the like that causes the classical computing engine to generate a quantum function call and provide the quantum function call. The real time engines of the controller receive the quantum function call and cause the quantum processor to perform a quantum algorithm and/or circuit based thereon. The controller determines quantum measurement information based on the performance of the quantum algorithm and/or circuit and provides a quantum call response including the quantum measurement information. The classical computing engine receives the quantum call response and continues execution of the program code and/or the like based at least in part on the quantum measurement information included in the quantum call response. Therefore, various embodiments improve the function of a quantum computer and/or classical computer.

VIII. Exemplary Computing Entity

FIG. 8 provides an illustrative schematic representative of an example classical computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may interact with a user interface of the classical computing entity 10 to program and/or write a quantum circuit in a quantum programming language and/or a classic compute algorithm. For example, the quantum circuit written in the quantum programming language 412 may be compiled (e.g., via a quantum programming language compiler 422) into DFL 424 that is compiled (e.g., by a hardware specific compiler 426 operating on the classical computing entity 10 and/or an RTE 310) into RT binary and/or machine level code 430 for execution by one or more RTEs 310. For example, the classic compute algorithm 414 may be compiled (e.g., via a classic language compiler 416) into compiled classical compute algorithm 418 program code. For example, the compiled classical compute algorithm 418 program code is WASM program code and/or executable instructions, in an example embodiment.

In various embodiments, a classical computing entity 10 comprises semiconductor-based processing resources and memory. As shown in FIG. 8, a classical computing entity 10 can include an antenna 812, a transmitter 804 (e.g., radio), a receiver 806 (e.g., radio), and a processing element and/or device 808 that provides signals to and receives signals from the transmitter 804 and receiver 806, respectively. The signals provided to and received from the transmitter 804 and the receiver 806, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 130 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system. In various embodiments, the classical computing entity 10 includes a network interface 820 configured to communicate via one or more wired and/or wireless networks 20.

The computing entity 10 may also comprise a user interface device comprising one or more user input/output interfaces (e.g., a display 816 and/or speaker/speaker driver coupled to a processing element and/or device 808 and a touch screen, keyboard, mouse, and/or microphone coupled to a processing element and/or device 808). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 818 (hard or soft), a touch display, voice/speech or motion interfaces, scanners, readers, or other input device. In embodiments including a keypad 818, the keypad 818 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 822 and/or non-volatile storage or memory 824, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

IX. Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method performed by one or more real time engines of a quantum computer, the quantum computer comprising a controller comprising the one or more real time engines in communication with at least one classical computing engine, and a quantum processor, the controller configured to control operation of one or more components of the quantum processor, the method comprising:
providing quantum measurement information to the at least one classical computing engine via a classical function call;
receiving a classical call response comprising an indication of a result determined via execution of a classical function by the at least one classical computing engine based at least in part on the classical function call; and
controlling operation of the one or more components of the quantum processor based at least in part on the result, wherein communication between the one or more real time engines and the at least one classical computing engine is asynchronous and the one or more real time engines comprise two or more real time engines and the communication between the two or more real time engines is synchronous.

2. The method of claim 1, wherein the controller further comprises or is in communication with one or more voltage source drivers and one or more laser drivers and controlling operation of the one or more components of the quantum processor comprises controlling operation of the one or more voltage source drivers and controlling operation of the one or more laser drivers.

3. The method of claim 1, wherein the one or more real time engines are configured to execute executable instructions compiled from Quantum Assembly (QASM) or a Quantum Intermediate Representation (QIR) code.

4. The method of claim 1, wherein the at least one classical computing engine is part of the controller.

5. The method of claim 1, wherein the classical function call and the classical call response are both in accordance with inter-component communication (ICC) standards.

6. The method of claim 1, wherein the quantum measurement information provides an indication of respective results of one or more quantum measurements and the one or more quantum measurements are syndrome measurements and the classical function is a quantum error correction (QEC) decoder.

7. The method of claim 1, wherein the quantum measurement information provides an indication of respective results of one or more quantum measurements captured during performance of a quantum circuit by the quantum processor.

8. The method of claim 1, wherein controlling operation of the one or more components of the quantum processor based at least in part on the classical call response comprises at least one of (a) selecting a quantum circuit portion to be performed, (b) conditioning one or more quantum gates, or (c) determining a number of times a quantum circuit portion is performed based on the classical call response.

9. The method of claim 1, wherein a time between the providing of the classical function call and receipt of the classical call response is less than a coherence time of a qubit of the quantum processor.

10. A system for hybrid quantum-classical computing, the system comprising:
a quantum computer comprising a controller and a quantum processor, the controller (a) configured to control operation of one or more components of the quantum processor and (b) comprising one or more real time engines and a first classical memory storing executable instructions;
a classical computing engine and a second classical memory storing program code;
wherein the program code is configured to, when executed by the classical computing engine, cause the classical computing engine to at least perform:
beginning to perform a quantum-assisted classical algorithm;
generating and providing a quantum function call such that the one or more real time engines cause the controller to control operation of the one or more components of the quantum processor to perform a quantum function and generate a quantum call response based on a result of performing the quantum function;
receiving the quantum call response; and
continuing to perform the quantum-assisted classical algorithm based at least in part on the quantum call response; and
wherein the executable instructions are configured to, when executed by the one or more real time engines, cause the quantum processor at least perform:
executing the quantum function in response to the quantum function call;
determining a quantum call response based on a result of executing the quantum function; and
providing the quantum call response such that the classical computing engine receives the quantum call response.

11. The system of claim 10, wherein the controller further comprises or is in communication with one or more voltage source drivers and one or more laser drivers and controlling operation of the one or more components of the quantum processor comprises controlling operation of the one or more voltage source drivers and controlling operation of the one or more laser drivers.

12. The system of claim 10, wherein communication between the one or more real time engines and the classical computing engine is asynchronous.

13. A controller of a quantum computing system, the controller (a) configured to control operation of one or more components of a quantum processor, (b) comprising one or more real time engines that are in communication with at least one classical computing engine, and c) comprises a classical memory storing executable instructions, wherein the executable instructions are configured to, when executed by the one or more real time engines, cause the controller to at least:
control operation of the one or more components of the quantum processor to cause the quantum processor to capture one or more quantum measurements;
provide quantum measurement information to the at least one classical computing engine via a classical function call;
receive receiving a classical call response comprising an indication of a result determined via execution of a classical function by the at least one classical computing engine based at least in part on the classical function call; and
control operation of the one or more components of the quantum processor based at least in part on the result,
wherein the one or more real time engines are configured to execute executable instructions compiled from Quantum Assembly (QASM) or a Quantum Intermediate Representation (QIR) code.

14. The controller of claim 13, wherein the controller further comprises or is in communication with one or more voltage source drivers and one or more laser drivers and controlling operation of the one or more components of the quantum processor comprises controlling operation of the one or more voltage source drivers and controlling operation of the one or more laser drivers.

15. The controller of claim 13, wherein communication between the one or more real time engines and the at least one classical computing engine is asynchronous.

16. The controller of claim 13, wherein the one or more quantum measurements are syndrome measurements and the classical function is a quantum error correction (QEC) decoder.

17. The controller of claim 13, wherein controlling operation of the one or more components of the quantum processor based at least in part on the classical call response comprises at least one of (a) selecting a quantum circuit portion to be performed, (b) conditioning one or more quantum gates, or (c) determining a number of times a quantum circuit portion is performed based on the classical call response.

18. The controller of claim 13, wherein a time between the providing of the classical function call and receipt of the classical call response is less than a coherence time of a qubit of the quantum processor.

19. The controller of claim 13, wherein the one or more real time engines comprise two or more real time engines and the communication between the two or more real time engines is synchronous.

20. The controller of claim 13, wherein the quantum measurement information provides an indication of respective results of one or more quantum measurements captured during performance of a quantum circuit by the quantum processor.

* * * * *